June 1, 1965   H. C. DAUBERT, JR   3,186,240
THERMOELECTRICALLY COOLED GYROSCOPE
Filed Oct. 25, 1962   2 Sheets-Sheet 1
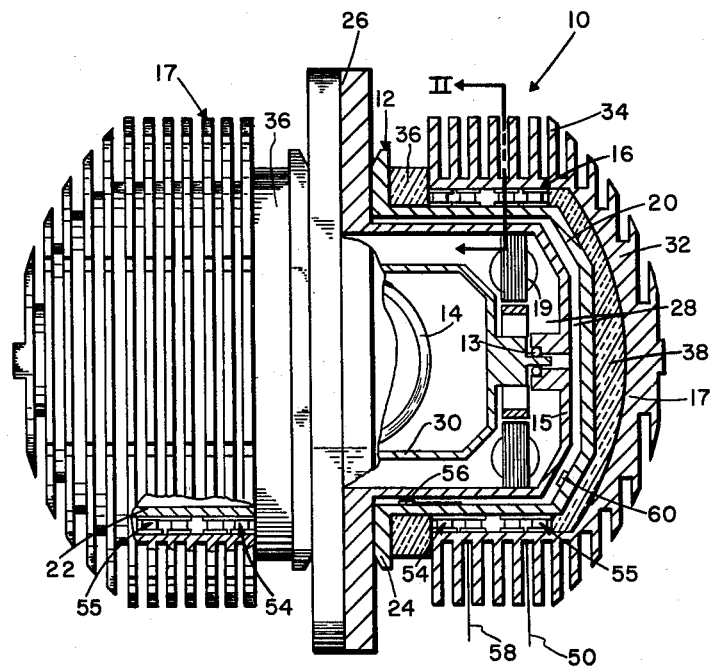
FIG. 1
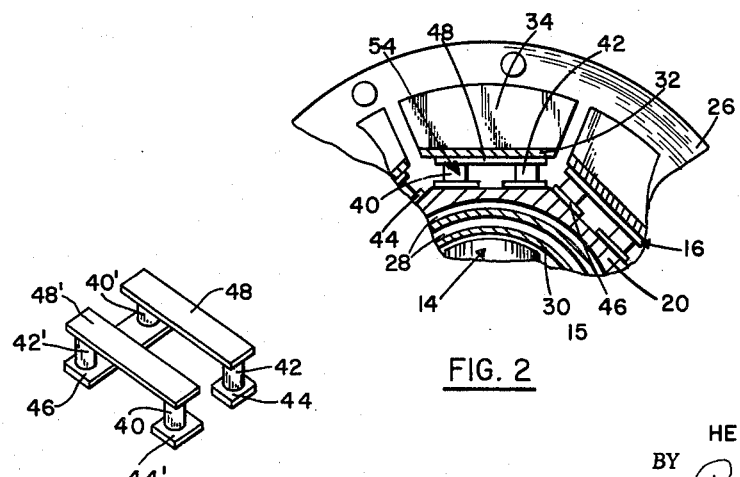
FIG. 2
FIG. 5
INVENTOR.
HENRY C. DAUBERT, JR.
BY
ATTORNEYS June 1, 1965 H. C. DAUBERT, JR 3,186,240
THERMOELECTRICALLY COOLED GYROSCOPE
Filed Oct. 25, 1962 2 Sheets-Sheet 2

INVENTOR.
HENRY C. DAUBERT, JR.
BY
ATTORNEYS

United States Patent Office 3,186,240
Patented June 1, 1965

3,186,240
THERMOELECTRICALLY COOLED GYROSCOPE
Henry C. Daubert, Jr., Grand Rapids, Mich.,
assignor to Lear Siegler, Inc.
Filed Oct. 25, 1962, Ser. No. 233,069
5 Claims. (Cl. 74—5)

This invention relates to precision measurement instruments requiring temperature control, especially gyroscopes, accelerometer and integrators, and more particularly to a gyroscope requiring a constant, uniform temperature.

High quality performance of gyroscopes, accelerometers or integrators is greatly dependent upon constant, uniform internal operating conditions, especially for those instruments whose damping characteristic depends upon maintaining a constant viscosity of the flotation and damping fluid, in spite of widely varying ambient temperatures. This high quality performance, to obtain extreme accuracy and great reliability, is especially needed in high speed air and space craft, and in surface and submarine vehicles. Yet, in operation of such crafts, the ambient temperature around the gyroscope often varies greatly, to thereby constantly change internal characteristics of the gyroscope, especially damping. Operating temperatures beginning at −55° C. and moving to +100 to +150 degrees C. are common. This imposes a heavy burden upon the gyroscope spin bearing lubricant, the flotation and damping liquid, and upon the insulation material of the instrument. Consequently, relatively frequent breakdown occurs, short instrument life results, and the quality of the gyroscope control constantly varies. Furthermore, dimensional stability of the internal materials is degraded, thereby lessening the accuracy of the gyroscope. Because of the widely varying operating temperatures, materials for gyroscope parts must withstand elevated temperatures without loss of strength or change of dimensions. Such materials are not necessarily the optimum materials for most accurate performance, however.

One aspect of this temperature variation is that an inherent zonal temperature variation often occurs over adjacent portions of gyroscopes and related instruments. This zonal temperature variation is created by the presence of more heat and higher temperature over the spin motor, torque generator, and angular displacement pick off which act as local heat sources, than at adjacent portions of the instrument. It has been found that the major warmer and cooler zones appear as generally circumferential rings over the axial length of the gyroscope. Further, the top of the gyroscope tends to be warmer than the bottom due to the tendency of the heat to rise.

Heretofore, elaborate, complex and bulky heat exchangers have been devised in unsuccessful efforts to maintain some semblance of a constant, uniform temperature. These have never been widely adopted. Other approaches have involved the wrapping of heater elements around the gyroscope housing to maintain it at a constant temperature. However, because the temperature control provides for heat input only, the instrument must be controlled at a constant temperature which is at least above the maximum expected ambient temperature plus the temperature rise due to its internally generated heat.

As far as it is known, no gyroscope of related instrument has been developed heretofore which achieves constant, uniform, over-all temperature continuously over the entire instrument.

It is therefore the principal object of this invention to provide a spinning-type precision instrument, especially a gyroscope, accelerometer, or integrator normally having variant temperature zones, that has a constant internal operating temperature regardless of the ambient temperature, either above optimum or below optimum, and regardless of the change of the ambient temperature. The gyroscope provides accurate, sensitive indication under all thermal conditions.

It is another object of this invention to provide a gyroscope or related instrument that maintains a uniform over-all temperature without zonal variations, both in elevated ambient temperatures and in very low ambient temperatures. All longitudinal and circumferential portions of the gyroscope are kept within one half of one degree C. or less of an optimum of, for example, about 60 degrees C. This enables instrument materials having optimum characteristics to be incorporated without loss of function at elevated temperatures. The instrument thereby provides sensitive, accurate operation. The novel instrument is relatively compact. It is adaptable to production techniques. It enables fluid suspended gyros to be held to a constant over-all bath temperature.

These and other objects of this invention will be apparent upon studying the following specification in conjunction with the drawings in which:

FIG. 1 is a side elevational, partially sectioned view of one embodiment of the invention as applied to a gyroscope;

FIG. 2 is a fragmentary sectional view taken through plane II—II of FIG. 1;

FIG. 5 is a perspective view of one group of thermoelectric elements.

Figure 3:
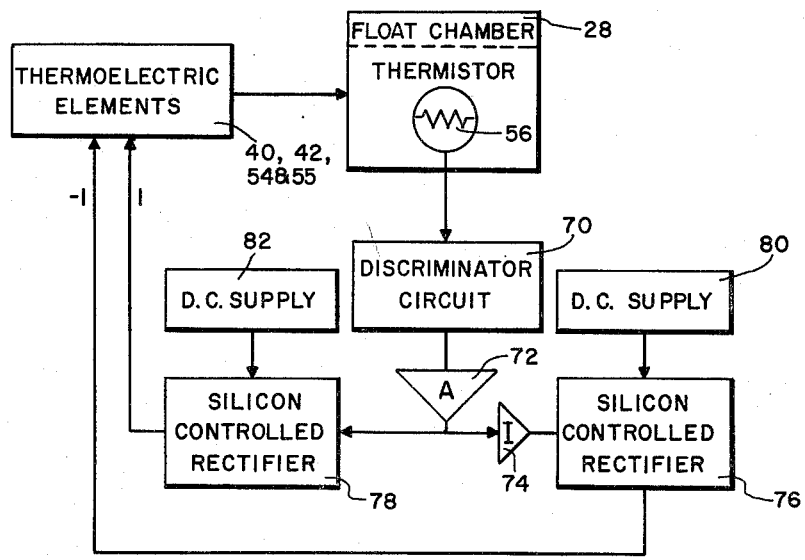
FIG. 3 is a schematic block diagram of one form of electrical control circuit for the novel gyroscope.

Basically, the inventive, constant temperature instrument comprises a housing or case having spinning rotor or wheel components mounted on bearings within a fluid filled chamber, a plurality of independent circumferentially extending thermoelectric temperature control rings over axial zones of said housing, each of the rings including heat conductor plates in thermal contact with the housing and spaced from each other circumferentially around the housing, a plurality of radially extending thermoelectric projections or elements mounted in pairs on the conducting plates, a plurality of distributor plates at the outer ends of the thermoelectric elements, and in contact with alternating pairs thereof, outer heat dissipating, finned cap means over the rings and in thermal contact with the distributor plates, temperature sensing means extending into the fluid filled chamber of the gyroscope or related instrument, and independent temperature control means for the separate thermoelectric rings of the gyroscope.

Referring to the drawings, the novel gyroscope 10 includes a case or housing 12, internal spinning rotor or wheel means 14 suspended in a canister 30, a frame 15, thermoelectric temperature control ring assembly 16, and a pair of finned caps 17.

Housing 12 comprises a pair of facing cup-shaped shells 20 and 22, each having a radially extending peripheral flange 24 on the inner end. The housing is assembled with and sealed to a pair of central annular support rings 26 which are an integral part of the frame 15 as is seen from the drawings. The internal spin-axis assembly represented by gyroscope wheel 14 may be of any conventional type. In fact, in the broadest aspects of this invention, the instrument may be an accelerometer or an electro-mechanical integrator. The gyroscope has a chamber 28 containing a damping liquid between the frame 15 and the rotor enclosing element 30, and between the frame and caps 20 and 22. The liquid provides flotation of the rotor enclosing element 30, provides viscous damping, and provides a heat transfer medium between the rotor enclosing element 30 and the outer housing 12. Element 30 is suspended in the frame by bearings 13, one of which is shown. A conventional torque generator 19 secured to frame 15 creates a torque as needed.

Positioned around the respective end shells is a pair of heat dissipating caps 32 having a plurality of integral, circumferentially extending, radially projecting, heat dissipating fins 34. Heat insulation rings 36 are provided around the housing shells and around the ends at 38 to minimize direct heat transfer between the inside and the outside of the gyroscope. This insulation may be any suitable material such as a plastic foam e.g. of polyurethane or polystyrene. Located between the housing shells 20 and 22 and their respective end caps is thermoelectric temperature control means 16. This temperature control means provides zonal regulation of the temperature. It is preferably in the form of a series of axially spaced rings. A total of four rings is shown, with two 54 and 55 on each end. This may be varied to suit the size and type of instrument. Each ring is composed of a plurality, here eight, groups of thermoelectric elements and plates like that shown in FIG. 5. Each group includes a plurality of conductor plates 44 and 46 against shells 20, four thermoelectric elements 40 and 42 extending therefrom, and dissipator plates 48 against caps 17. The radially projecting thermoelectric elements are pre-attached to the plates before attachment of the plates to the shells and caps.

Plates 44 and 46 are firmly attached to the flat outer polygonal surface portions of the end shells 20 and 22. Plates 48 are attached to the flat inner portions 32 of the end caps. The thermoelectric elements are semi-conductor materials of P and N types in alternating arrangement. One suitable semi-conductor is bismuth telluride, i.e., actually bismuth-telluride-antimony-selenide alloys of P and N types known to those in the art. The elements or projections are generally cylindrical or rectangular in shape. The plates on both ends are of a suitable metal, e.g., copper. Copper lends good heat conducting qualities. The current is passed first through plate 44, element 42, plate 48, element 40', plate 46, element 42', plate 48', element 40, plate 44' and on to the next group on the adjacent flat side of the polygonal housing through electrical leads. To produce the opposite effect the current is reversed.

The end shells are shown to be octagonal, but the number of sides can vary. It is preferable to utilize a polygonal, rather than a circular, cross section due to the ease of providing good thermal contact between plates 44 and 46 and the shells. The outer ends of thermoelectric elements 40 and 42, etc., are mounted in pairs to dissipator plates 48 in contact with the inner flat surface portions of the finned cap 32, which has an octagonal inner periphery. The elements in each ring are in electrical series with each other around the circumference of the housing. Thus, each plate 48 is in contact with one pair of thermoelectric projections while the adjacent inner plates 44 are in electrical contact with alternate pairs around the housing. For example, of four projections, one inner plate 44 will contact #1 and #2, outer plate 48 will contact #2 and #3, plate 46 will contact #3 and #4, and so forth. The current thus flows in electrical series in one direction through one element, in the opposite direction through the next element and so forth. The conductor plates can be bent around the corners of the octagonal case. Electrical leads, e.g., 50 are inserted through the end shells and caps (FIG. 1) to provide independent electrical connection to each ring. Each ring is therefore independently controllable to provide exact control over each axial zone of the gyroscope. Thereby the temperature of the entire instrument is regulated and held constant, even though different portions have varying heat generating tendencies.

With the float type gyroscope illustrated, over-all, accurate temperature control can be effected if the two inner rings 54 of thermoelectric elements are controlled with the same control means and circuit, and the two outer rings 55 are controlled by the same control means and circuit. A temperature sensing element 56 extending into fluid filled float chamber 28 and having an electrical lead 58 extending outwardly through the housing shell 30 and through the dissipator cap 32 is provided for the inner rings and their control means. A second temperature sensing element 60 cooperates with the control means for the two outer rings 55. Circumferential portions of the housing may also be provided with different heat input or out-take capacity by making some of the thermoelectric elements on the top of the housing larger or more numerous than those on the bottom.

Figure 4:
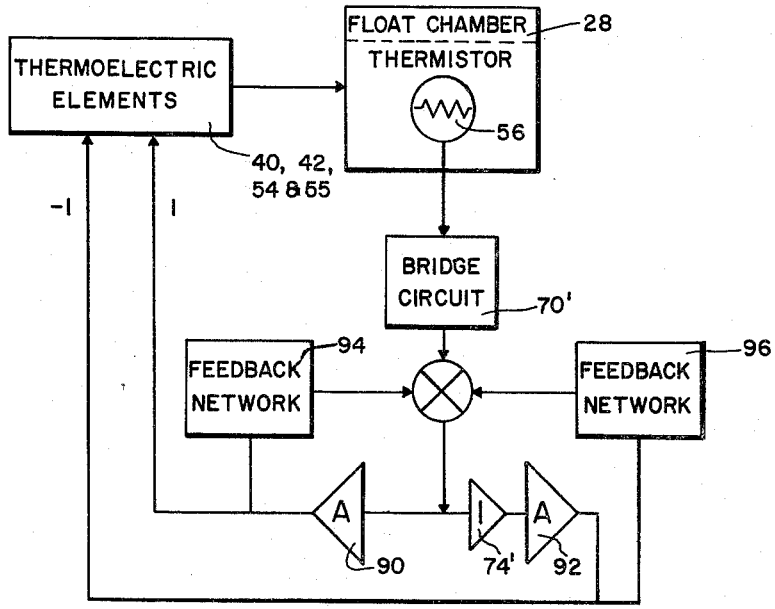
FIG. 4 is a block schematic diagram of a second form of electrical control circuit useful in this invention.

Depending upon the accuracy of the temperature control desired, either an off-on control circuit like that illustrated in FIG. 3 or a proportional control circuit like that illustrated in FIG. 4 may be utilized, the latter of course being more accurate. Referring to FIGS. 1 and 3, the fluid filled float chamber has a sensing element 56 therein. The sensor is preferably a conventional thermistor connected across one leg of a bridge circuit to control the "balance" of the bridge or discriminator circuit 70. The signal output of the discriminator circuit when unbalanced by the thermistor output is passed through an amplifier 72 to make the signal useful. The output of the amplifier 72 is put through one of two silicon controlled rectifiers. Both rectifiers are needed since the temperature may vary up or down from the preset standard or norm. If it rises, current from amplifier 72 will flow through inverter 74 and silicon controlled rectifier 76 to impress a negative voltage upon thermoelectric elements 40, 42, etc. This causes a current flow in one direction through the thermoelectric elements to provide cold junctions adjacent the conductor plates 44 and 46, etc. and thereby lower the temperature of the fluid in the gyroscope float chamber. If, on the other hand, the temperature of the float chamber fluid drops, this change is detected by thermistor 56 and bridge circuit 70. A signal from the bridge is amplified by amplifier 72, and passes through silicon controlled rectifier 78, so that current of the opposite direction passes through the thermoelectric elements to provide hot junctions adjacent the conductor plates 44 and 46, etc. This heats the housing and fluid until the temperature rises to eliminate the discrepancy from the desired norm. The D.C. supplies 80 and 82 respectively to supply the output of the silicon controlled rectifiers when activated by the unbalanced bridge output. The inverter 74 is to assure that only one of the silicon controlled rectifiers is operating at a time.

In FIG. 4 a proportional controller circuit is shown. Here again thermistor 56 extends into the fluid in float chamber 28 and controls the balance of a bridge circuit 70'. The output of the bridge circuit is passed through one of two proportional amplifiers 90 and 92 to apply current in one direction or the other to the thermoelectric elements, to apply heat or refrigeration to the float chamber through the housing shell. Inverter 74' is utilized to assure that current will flow through only one of the proportional amplifiers at a time. Feedback networks 94 and 96 from each proportional amplifier 90 and 92 provide electrical damping of the current.

Instead of the two circuits illustrated in FIGS. 3 and 4, other equivalent well-known circuits could be used. For example, magnetic amplifiers could be used in a proportional controller.

Operation

In assembly of the apparatus the thermoelectric control means are pre-assembled between the housing shells 20 and 22 and their respective end caps. Each of the eight groups of each of the four rings are carefully pre-attached together with the insulation. Each group is electrically connected to the adjacent groups in the ring by electrical leads. The housings with attached thermoelectric means are attached to the mounting rings 26 and serve as independent members which function as the hermetically sealed case of the unit.

Next, the electrical circuits in FIG. 3, for controlling the thermoelectric elements are connected to the leads of the thermistors 56 and 60. As stated previously, the two inner rings 54 may be connected to the same bridge circuit 70 and 70' using the same thermistor 56 as a sensor. Likewise, the outer two rings may utilize the same thermistor 60 as the sensor, and be connected to the same bridge circuit 70 and 70'. Thus, there may be one control circuit for each two rings, i.e., two control circuits in all, either of the type shown in FIG. 3 or FIG. 4, or both, depending upon the requirements of and the conditions under which the instrument is to operate. Assuming that the chosen operating temperature of the fluid in the gyroscope is 60 degrees C. plus or minus 0.1 degree C. or less, bridge circuit 70 or 70' of conventional construction, is adjusted to be balanced at this temperature. If the temperature rises above 60 degrees, for example ½ degree C., thermistor 56 will cause an unbalanced condition in the discriminator or bridge circuit 70. This will cause the signal to pass through amplifier 72, through silicon control rectifier 78, and apply a current in one direction through the thermoelectric elements. This will cool or refrigerate a portion of the housing by creating "cold" junctions between the thermoelectric projections and the lower or radially-inner, conductor plates 44 and 46 according to the well-known Peltier effect. The junctions between the elements and plates 48 will be the "hot" ones. As soon as the temperature is lowered to the 60 degrees desired, the unbalanced bridge condition caused by thermistor 56 is eliminated and current stops flowing.

Undesirable lowering of the temperature in the float chamber affects the thermistor oppositely to create an opposite bridge unbalance causing the output signal to amplifier 72 to flow through inverter 74, silicon controlled rectifier 76, and in the opposite direction through the thermoelectric elements to create hot junctions adjacent the instrument case. This applies heat to the gyroscope housing and the fluid in the chamber 28 until the temperature again rises to 60 degrees, at which time the unbalanced is eliminated and current flow stops.

Utilizing the circuit in FIG. 4, the temperature control effect is very similar, except that instead of the on-off action of the FIG. 3 circuit, current from bridge circuit 70' through proportional amplifiers 90 and 92 (depending upon whether the chamber temperature is too high or too low), will be in direct proportion to the unbalance of the bridge circuit and in the required direction. This prevents overshooting of the temperature since, as is conventional with proportional control systems, if the temperature variation is only slight, the current will be slight, and if it is large, the current will be large. It is realized that these illustrative control circuits may be modified in various ways well-known to those having ordinary skill in the art, without departing from the principles of the invention as taught. In fact, this invention may be modified structurally in a variety of ways to suit a particular situation, ambient temperature, instrument structure, or conditions of use, within the principles of the invention as taught. These obvious modifications of the constant, uniform temperature, zonal regulated gyroscope, accelerometer, or electro-mechanical integrator are deemed to be part of this invention, which is to be limited only by the scope of the appended claims and the releasably equivalent structures to those defined therein.

I claim:

1. A uniform-temperature motion responsive instrument having zones of varying heat output comprising: an instrument housing containing an inertial assembly on a rotational axis and a fluid filled chamber around said assembly; a finned heat transfer shell around said housing and spaced therefrom; a plurality of thermoelectric heat transfer rings between and in thermal contact with said shell and housing, positioned over zones of differing heat output; each of said rings including a first plurality of circumferentially-spaced plates in thermal contact with said housing, thermoelectric elements in contact with said plates and a second plurality of plates in contact with said elements and with said shells; and separate electrical input and control means operatively connected to respective ones of said rings of different heat output zones and including temperature sensing means in said fluid filled chamber to thereby add or subtract heat from each zone in a controlled manner and obtain a uniform, constant instrument temperature.

2. A gyroscope, comprising: a spin-axis assembly including a spin wheel and a housing around said wheel; a support frame over said housing comprising a pair of frame elements having abutting mounting flanges; bearing mounts suspending said housing on said frame elements; a pair of end caps over said frame elements, generally spaced therefrom, and having portions mounted to said flanges; fluid chambers containing a damping and heat transfer liquid between said caps and frame and said frame and housing; a plurality of thermoelectric, axially spaced, circumferentially extending, temperature control rings around said caps; each of said rings having a plurailty of circumferentially spaced plates around and in thermal contact with said caps, a plurality of thermoelectric elements attached to said plates and extending radially therefrom, and a plurality of dissipator plates in thermal contact with said thermoelectric elements; a pair of finned half-shells secured over said rings and caps and in thermal contact with said dissipator plates; thermal insulation between said shells and said caps adjacent said rings; and at least two controlling electrical input means operatively connected to separate ones of said rings to control the temperature of portions of said gyroscope, and including temperature sensing means in said fluid chambers.

3. A gyroscope, comprising: a spin-axis assembly including a spin wheel and a housing around said wheel; a support frame over said housing; bearing mounts suspending said housing on said frame; a pair of end caps over said frame, generally spaced therefrom; fluid chambers containing a damping and heat transfer liquid between said caps and frame and said frame and housing; thermoelectric temperature control means around said caps; each of said control means having a plurality of plates in thermal contact with said caps, a plurality of thermoelectric elements attached to said plates and extending radially therefrom, and a plurality of dissipator plates in thermal contact with said thermoelectric elements; a pair of finned half-shells secured over said caps and in thermal contact with said dissipator plates; and controlling electrical input means operatively connected to said control means to regulate the temperature of portions of said gyroscope, and including temperature sensing means in said fluid chambers.

4. A gyroscope comprising: a spin-axis assembly including a spin wheel and a housing around said wheel and having opposite ends; bearings supporting said housing ends; a pair of end caps around said housing; a fluid filled chamber around said housing; a plurality of thermoelectric axially spaced, circumferentially extending, temperature control rings around said caps; each of said rings having a plurality of circumferentially spaced plates around and in thermal contact with said caps, a plurality of thermoelectric elements attached to said plates and extending radially therefrom, and a plurality of dissipator plates in thermal contact with said thermoelectric elements; a pair of finned half-shells secured over said rings and caps and in thermal contact with said dissipator plates; thermal insulation between said shells and said caps adjacent said rings; and at least two controlling electrical input means operatively connected to separate ones of said rings to control the temperature of portions of said gyroscope, and including temperature sensing means in said fluid chambers.

5. A constant temperature inertial instrument comprising: an inertial member rotatably mounted on an axis, and a housing around said wheel; bearing mounts suspending said housing; a pair of oppositely oriented end caps enclosing and sealing said housing; fluid chamber means between said housing and end caps containing a damping and fluid transfer liquid; thermoelectric temperature control means around said caps; each of said control means having a plurality of plates in thermal contact with said caps, a plurality of thermoelectric elements attached to said plates and extending radially therefrom, and a plurality of dissipator plates in thermal contact with said thermoelectric elements; a pair of finned half-shells secured over said caps and in thermal contact with said dissipator plates; and controlling electrical input means operatively connected to said control means to regulate the temperature of portions of said gyroscope, and including temperature sensing means in said fluid chamber means.

References Cited by the Examiner
UNITED STATES PATENTS 3,091,919 6/63 Coles _____ 62—3 X
3,097,027 6/63 Mims et al. _____ 62—3 X BROUGHTON G. DURHAM, *Primary Examiner.*